United States Patent [19]

Popov et al.

[11] 4,267,471
[45] May 12, 1981

[54] LINEAR INDUCTION MOTOR

[76] Inventors: Alexandr D. Popov, pereulok Rynochny, 44; Vladimir A. Solomin, ulitsa Dachnaya, 14, kv. 31, both of Rostov-na-Donu; Dmitry A. Zvezdunov, ulitsa Estonskaya, 248-b, Bataisk, all of U.S.S.R.

[21] Appl. No.: 968,726

[22] Filed: Dec. 13, 1978

[30] Foreign Application Priority Data

Mar. 1, 1978 [SU] U.S.S.R. .................................. 2584449

[51] Int. Cl.³ .......................................... H02K 41/02
[52] U.S. Cl. ..................................................... 310/13
[58] Field of Search .................................. 310/12-24; 318/138

[56] References Cited

U.S. PATENT DOCUMENTS

| | | | |
|---|---|---|---|
| 3,233,559 | 2/1966 | Smith et al. ..................... | 310/13 UX |
| 3,585,423 | 6/1971 | Bolton et al. .................... | 310/13 |
| 4,013,906 | 3/1977 | Eastham et al. ................ | 310/13 |
| 4,049,983 | 9/1977 | Attwood et al. ................ | 310/13 |

*Primary Examiner*—Donovan F. Duggan
*Attorney, Agent, or Firm*—Steinberg & Raskin

[57] ABSTRACT

A linear induction motor comprises an inductor that has a multiphase concentrated winding and a magnetic circuit made of a plurality of transversely laminated cores, and also comprises a secondary element having an electrically conductive member disposed on a magnetically conductive base. The yoke of each of said cores has a hole, a spring is located between each pair of adjacent cores, and a rod is adapted to pass through the holes and the springs, said rod being coupled with a regulation element. The invention makes it possible to accelerate and brake smoothly high-speed ground transportation vehicle so that more safe conditions for a vehicle's crew are provided.

3 Claims, 3 Drawing Figures

LINEAR INDUCTION MOTOR

BACKGROUND OF THE INVENTION

1. Field of the Invention

The invention relates to electrical machines, and more particularly to linear induction motors.

The motor of the invention can find use, for example, to propel high speed transportation vehicles. It can also find use wherever a rectilinear or reciprocating movement of the working members is required such as, for example, use in conveyors, electric drives and the like.

2. Description of the Prior Art

Known in the art is a linear induction motor (cf. the USSR Inventor's Certificate No. 544,065, cl.HO2K 41/04) comprising an inductor having a multiphase concentrated winding and a magnetic circuit comprised of a plurality of laminated cores arranged at right angles to the direction of movement of the inductor and connected to one to another by means of a plurality of laminated cores arranged along the direction of movement of the inductor, and also comprising a secondary element that has an electrically conductive member disposed on a magnetically conductive base.

In the known motor, no means is provided which could regulate the velocity with which the inductor is moved relative to the secondary element.

Known in the art is another linear induction motor (cf. British Pat. No. 1,314,161, cl. H2A, 1973) comprising an inductor that has a multiphase concentrated winding and a magnetic circuit having a plurality of transversely laminated cores of an inverted U-shape, each such core including legs connected by a yoke, and also comprising a secondary element relative to which the inductor is displaced. The secondary element has an electrically conductive member disposed on a magnetically conductive base.

In this motor, there is no means to regulate the velocity with which the inductor is moved relative to the secondary element.

SUMMARY OF THE INVENTION

An object of the invention is to provide a linear induction motor having an inductor and a secondary element relative to which the inductor is moved in a manner that the velocity of the inductor can be regulated.

There is provided a linear induction motor comprising an inductor having a multiphase concentrated winding and a magnetic circuit that has a plurality of transversely laminated cores including legs interconnected by yokes, and also comprising a secondary element relative to which the inductor is moved, the secondary element having an electrically conductive member disposed on a magnetically conductive base, the yoke of each of the transversely laminated cores being provided with a hole, a spring being disposed between each pair of adjacent transversely laminated cores, and a rod being adapted to pass through the holes and the springs, the rod being coupled with a regulation element.

Advantageously, the linear induction motor should comprise a nut that acts as the regulation element, while one end of the rod is provided with a thread.

Preferably, the linear induction motor should comprise a linear cylindrical step electric motor whose inductor acts as the regulation element, the step motor having a clutch adapted to connect the inductor of the step motor with one of the endmost transversely laminated cores, and that portion of the rod which is adjacent said endmost transversely laminated core acts as the secondary element of the step motor.

The motor of the invention makes it possible to regulate the velocity with which the inductor of the motor is moved relative to the secondary element thereof in a simple and effective manner. Therefore, no expensive mains voltage frequency converters or complex pole-changing windings of the motor inductor are required, while the regulation of the velocity with which the inductor moves relative to the secondary element allows for smooth acceleration and braking of high-speed ground transportation vehicles with the result that more safe conditions for a vehicle's crew are provided.

DESCRIPTION OF THE DRAWINGS

The invention will now be described, by way of examples, with reference to the accompanying drawings, in which.

DESCRIPTION OF THE INVENTION

Figure 1:
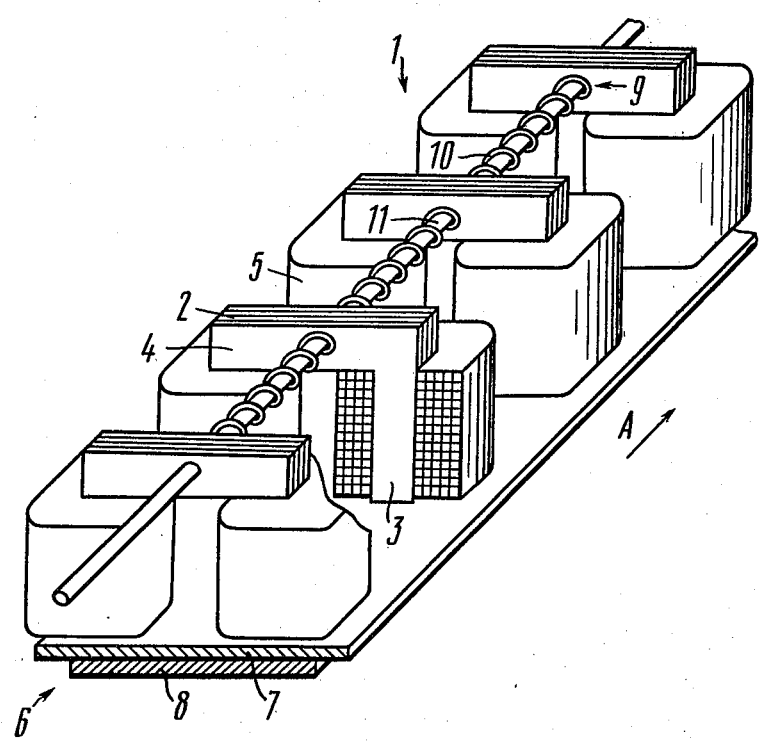
FIG. 1 is a diagrammatic representation of a linear induction motor, according to the invention.

The motor of the invention comprises an inductor 1 (FIG. 1) including a plurality of transversely laminated cores 2 that feature, according to the given embodiment, an inverted U-shape. Each of the transversely laminated cores 2 comprises legs 3 interconnected by a yoke 4, while the inductor 1 has a multiphase concentrated winding 5.

There is a secondary element 6 relative to which the inductor is moved in a direction indicated by the arrow A. The secondary element 6 has an electrically conductive member 7 disposed on a magnetically conductive base 8.

A hole 9 is provided in the yoke 4 of each of the transversely laminated cores 2. A spring 10 is located between each pair of adjacent cores 2 and a rod 11 is adapted to pass through the holes 9 and the springs 10, said rod 11 being coupled with a regulation element.

In order to provide for smooth regulation of the velocity of the inductor 1 (FIG. 2) relative to the secondary element 6 (FIG. 1) one end of the rod 11 is provided with a thread by which the rod 11 is coupled with a nut 12 acting as the regulation element. The threaded portion of the rod 11 has its length determined by the desired velocity regulation limits. Note that the velocity of the inductor 1 can be decreased or increased relative to its nominal magnitude during regulation.

To provide for a stepwise regulation of the velocity of the inductor 1 (FIG. 3) of the motor of the invention relative to the secondary element 6 (FIG. 1), the rod 11 (FIG. 3) is coupled with a regulation element implemented as an inductor 13 of a linear cylindrical step electric motor, a clutch 14 being used to couple the inductor 13 with one of the endmost transversely laminated cores 2. That portion of the rod 11 which is adjacent said endmost core 2 acts as the secondary element of the step motor. In the given embodiment, the clutch 14 is made of a robust insulating material, for example, textolite or ebonite and is coupled with the inductor 13 and the core 2 by means of epoxy cement.

In the given embodiment, that portion of the rod 11 which serves as the secondary element of the step motor is a cylindrical one and grooves are made therein to constitute the teeth of that secondary element. The length of the portion of the rod 11 serving as the secondary element of the step motor is determined by the desired regulation limits for the velocity of the motor of the invention.

The motor of the invention operates in the following manner. When the multiphase concentrated winding 5 (FIG. 1) is connected to an a.c. voltage source, a magnetic field is formed which travels in a direction opposite to that indicated by the arrow A and tends to cross the electrically conductive member 7 of the secondary element 6. As a result, an electromotive force created by induction in the member 7 produces in the latter eddy currents that interact with the travelling magnetic field. This results in a production of the traction force applied in the direction indicated by the arrow A and of the lifting force of the motor of the invention.

To provide for smooth regulation of the velocity of the inductor 1, the nut 12 (FIG. 2) is rotated, the springs 10 driven by the rod 11 are caused to increase or decrease their length and the pole pitch of the inductor 1 is changed in such a manner that the number of the pole pairs of the multiphase concentrated winding 5 is held constant. Note that a variation of the pole pitch can be as small as possible, which provides for a smooth regulation of the velocity of inductor 1. In this case, the synchronous speed of the motor of the invention, equal to a doubled product of the pole pitch of the inductor 1 and the mains voltage frequency, is varied, that variation being selected as small as possible.

The velocity of the inductor 1, which is dependent on the synchronous speed and the slip of the motor of the invention, is varied too.

To provide for a decrease in the velocity of the inductor 1, operate the nut 12 so as to compress the springs 10, with the result that the value of the pole pitch is decreased. Rotating the nut 12 in the opposite sense results in a lengthening of the springs 10 and in a respective increase in the pole pitch and in the velocity of the inductor 1.

To provide for a stepwise regulation of the velocity of the inductor 1 (FIG. 3), the inductor 13 of the step motor is connected to the voltage source. The inductor 13 is responsible for the movement of the rod 11, thereby causing the springs 10 to shorten or lengthen. As a result, the pole pitch and the velocity of the inductor 1 are changed. The value of the regulation steps is dependent on the design features of the step motor.

In the motor of the invention, the velocity of its inductor can therefore be regulated in both smooth and stepwise fashion.

Figure 2:
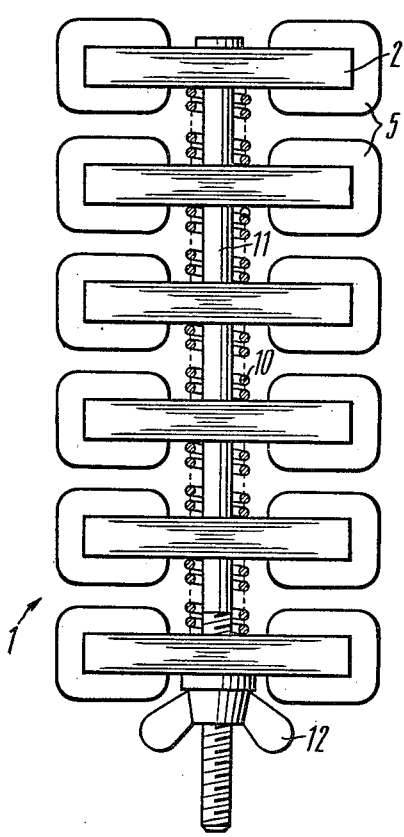
FIG. 2 is a plan view of the inductor of the linear induction motor of FIG. 1, in which a nut acts as a regulation element, according to the invention.
Figure 3:
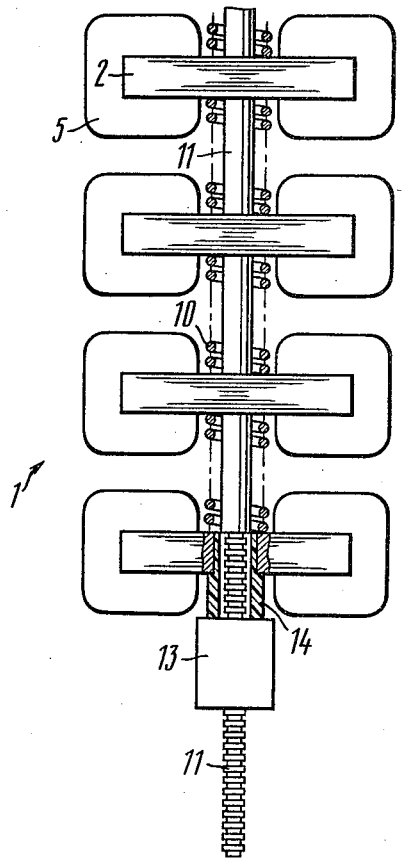
FIG. 3 is a plan view of the linear induction motor of FIG. 1, in which the inductor of a linear cylindrical step electric motor acts as a regulation element.

Thus, as is apparent from the above description, the embodiment of the invention illustrated in FIG. 3 operates as follows. When the linear electric motor inductor winding is connected to an AC voltage source, a traveling magnetic field is generated which intersects the current-conducting member 7 of the secondary element 6 (FIG. 1). At this time, an electromotive force is induced in the current-conducting member 7 which produces eddy currents therein. These eddy currents interact with the traveling magnetic field in the magnetically conductive base 8. As a result of this interaction, the traction force of the linear electric motor is created.

To control the velocity of movement of the electricl motor inductor, the pitch of the inductor poles is changed. To this end, an electric pulse is applied to the winding of the inductor 13 of the cylindrical linear step motor so that under the action of each electric pulse, the adjustment rod is rotated so as to perform a linear displacement through a single predetermined step. As this occurs, the springs 10 which are spaced between the cores 2 are compressed or extended thereby changing the pole pitch value of the inductor of the linear electric motor. This in turn changes the velocity of the traveling magnetic filed which is determined by the pole pitch thereby changing the linear displacement velocity.

What is claimed is:

1. A linear induction motor comprising:
   an inductor;
   a multiphase concentrated winding of said induction having a plurality of pole pairs;
   a plurality of spaced transversely laminated cores comprising said plurality of pole pairs and defining a magnetic circuit of said inductor, each of said cores including a yoke provided with a hole and legs interconnected by said yoke;
   a spring located between each pair of adjacent ones of said transversely laminated cores;
   a rod passing through said holes and said springs;
   means coupled to said rod for regulating the spacing between said cores such that the number of pole pairs of the multiphase concentrated winding is maintained constant;
   a secondary element relative to which said inductor is moved;
   a magnetically conductive base of said secondary element; and
   an electrically conductive member disposed on said magnetically conductive base.

2. A linear induction motor as claimed in claim 1, wherein said regulating means comprises a threaded end of said rod and a threaded element engaged on said threaded rod end.

3. A linear induction motor as claimed in claim 1, wherein said regulating means comprises
   an inductor of a linear cylindrical step electric motor,
   a clutch adapted to couple said inductor of said step motor with one of the endmost transversely laminated cores; and wherein
   the portion of said rod adjacent said endmost transversely laminated core acts as a secondary element of said step motor.

* * * * *